United States Patent [19]

Vangreen

[11] 4,245,806
[45] Jan. 20, 1981

[54] MULTI-LEVEL MULTI-PIPE HANGER

[76] Inventor: Charles F. Vangreen, 411 W. 29th Ave., Bellevue, Nebr. 68005

[21] Appl. No.: 930,508

[22] Filed: Aug. 3, 1978

Related U.S. Application Data

[63] Continuation of Ser. No. 760,229, Jan. 17, 1977, abandoned.

[51] Int. Cl.³ .............................. F16L 3/14; F16L 3/22
[52] U.S. Cl. ........................................ 248/59; 248/62; 248/68 R
[58] Field of Search .................... 248/59, 58, 60, 61, 248/62, 68 R, 68 CB, 327; 138/107, 112

[56] References Cited

U.S. PATENT DOCUMENTS

| | | | |
|---|---|---|---|
| 535,707 | 3/1895 | MacTaggart | 248/62 X |
| 566,544 | 8/1894 | Smith | 248/68 R |
| 591,249 | 10/1897 | Emery | 248/68 R X |
| 844,036 | 2/1907 | McMurtrie | 248/68 R |
| 1,336,388 | 4/1920 | Youngberg | 248/68 R X |
| 1,356,040 | 10/1920 | Caskey | 248/68 R X |
| 2,384,440 | 9/1945 | Carr | 248/61 |
| 2,394,240 | 2/1946 | Harrison | 248/68 R |
| 2,407,217 | 9/1946 | Banneyer | 248/68 R |
| 2,470,814 | 5/1949 | Hain | 248/68 R |
| 2,990,150 | 6/1961 | Weigel et al. | 248/68 R |
| 3,261,580 | 7/1966 | Schauster | 248/62 |
| 3,687,406 | 8/1972 | Krahe et al. | 248/59 X |
| 3,866,871 | 2/1975 | Dupuy | 248/59 |

FOREIGN PATENT DOCUMENTS

| | | | |
|---|---|---|---|
| 637342 | 4/1928 | France | 248/68 R |
| 774591 | 12/1934 | France | 248/68 R |
| 399285 | 10/1933 | United Kingdom | 248/68 R |
| 415390 | 8/1934 | United Kingdom | 248/68 R |

*Primary Examiner*—Rodney H. Bonck
*Attorney, Agent, or Firm*—Hiram A. Sturges

[57] ABSTRACT

A multi-pipe hanger comprising a support assembly extending generally horizontally, first and second downwardly depending sections attached to respective ends of said support assembly, a first pipe receiving module which is concave on its upper side, connecting means connecting ends of the first pipe-receiving module to downwardly depending sections respectively. One or more other pipe-receiving modules also having upwardly facing concave surfaces for receiving pipes, said one or more other modules forming portions of one of the connecting means connecting ends of said first module to said support assembly. The support assembly comprising a pair of attachment sections disposed one above another, and an anchor shaft extending through openings in said attachment sections and secured to said attachment sections.

A gang pipe hanger comprising a plurality of multi-pipe hangers disposed one above the other on the same ceiling rod anchor and shaped and positioned so that horizontally extending T-pipe sections can extend outward in either direction from a pipe received in any one of the modules of the gang pipe hanger without interference with any other of the multi-pipe hangers in the gang hanger.

6 Claims, 10 Drawing Figures

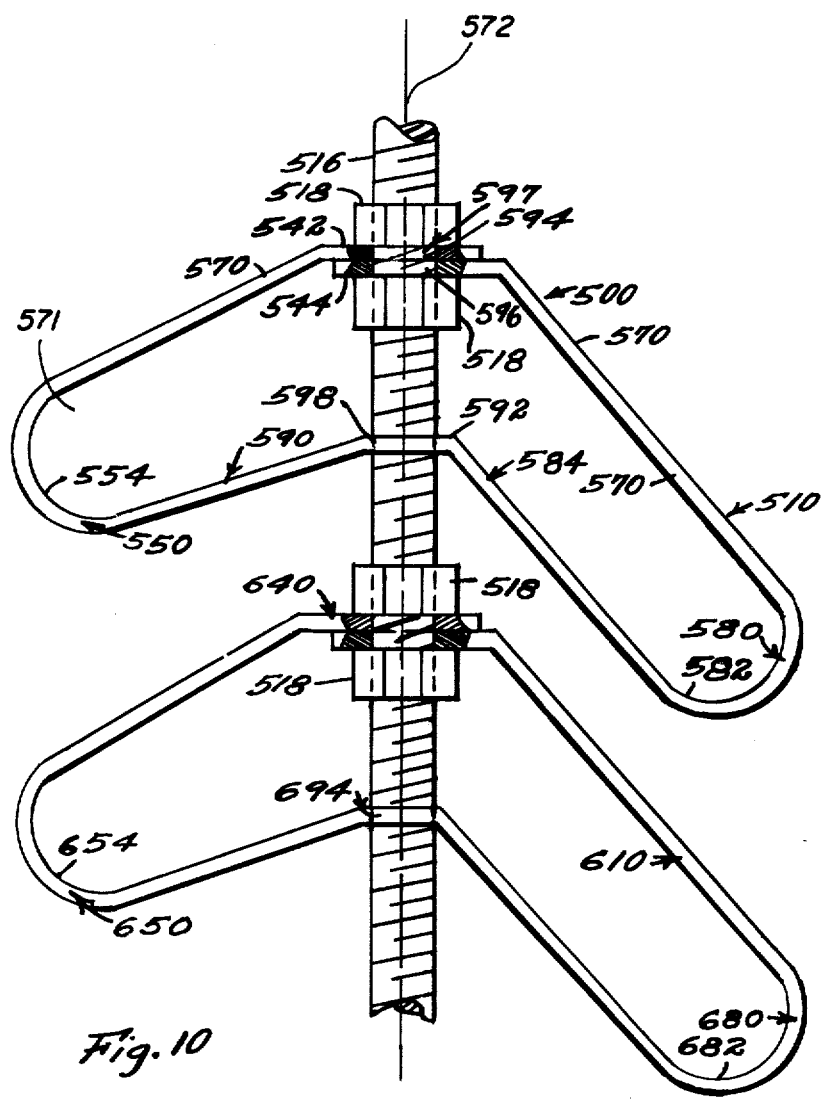

MULTI-LEVEL MULTI-PIPE HANGER

This application is a continuation of my co-pending patent application, Ser. No. 760,229, filed Jan. 17, 1977, titled: Multi-Pipe Hanger, and now abandoned.

BACKGROUND OF THE INVENTION

Heretofore pipe hangers for hanging many pipes, such as natural gas pipes in a building, have had complex and expensive forms.

One such form has been a horizontally extending piece of angle iron anchored by nuts at its center to a vertical threaded shaft and used for supporting two parallel pipes, one on each side of the shaft, with ends of the angle iron horizontal member upturned to retain the pipes. Such a method is both unsightly and expensive, and is not a completely positive retaining since the pipes are not surrounded.

Multiple pipes in parallelism have also been suspended by the trapeze type of suspension system which involves a horizontal support member with its ends attached by nuts to spaced vertical threaded shafts, and with the plurality of pipes rested on the horizontal member and disposed between the shafts. This method requires extra cost for extra shaft, extra nuts, extra labor in mounting the shaft, and extra labor in attaching two extra nuts. It is also a method which is bulky, whereby it will not fit in some of the tight places in construction.

It is an object of this invention to provide a multi-pipe pipe hanger which is compact and which will fit into tight places. In fact, the hanger is as compact as possible for doing the job.

In the past the only available method of compactly suspending two parallel pipes has been by means of adjacent pairs of single pipe hangers, each one used separately on respective ones of two parallel pipes. Such single pipe hangers have been made of single pieces of metal strap, beginning with upper portions disposed horizontally and one above another and fixed by nuts to a single shaft extending vertically, and with the strap simply extending down under a pipe and back up again. This is suitable for mounting a single pipe.

However, it is my concept that rather than have the expense of providing two separate hangers to suspend two separate pipes at a given location that instead a single multi-pipe hanger can do it and if made by my concept can still be an economical substantially one-piece hanger consisting of one strap attachable by two nuts to a vertical shaft.

It is an objective hereof to provide multiple concave pipe-receiving grooves in a single strap, the grooves being two or more, and being either on the same level and horizontally spaced apart, or else on multiple levels, spaced both horizontally and vertically with respect to each other.

SUMMARY OF THE INVENTION

The main concept of this invention is to provide a multi-pipe hanger, the major part of which is a single piece of material, preferably sheet metal bent into a shape for providing a support assembly at its upper end having a pair of attachment sections disposed one above the other, the attachment sections having an anchor shaft opening therethrough for receiving an anchor shaft to which they are secured by suitable retainer means, such as a nut on the shaft beneath the lower attachment section, and another nut on the shaft above the upper attachment section whereby the attachment sections are compressed between the two nuts, the major portion having first and second downwardly depending sections attached to respective ones of the pair of attachment sections at opposite ends of the support assembly, and a plurality of pipe-receiving segments, each having a concave upper pipe-receiving surface and connecting segments connecting adjacent sides of said pipe-receiving modules together, and also connecting ends of end ones of said pipe-receiving modules to respective ones of said downwardly depending sections.

A further object is to provide the concept of having two or three or more pipe-receiving segments disposed either at the same or different levels.

A particular object is to provide a special pipe hanger as described in which the upper pipe-receiving surfaces of the pipe-receiving segments are stair-stepped so as to be sequentially spaced apart substantially evenly from right to left, and sequentially disposed at substantially even gradations of level from right to left.

A most special objective is to provide a very efficient gang pipe hanger comprising a plurality of multi-pipe hangers disposed one above the other on the same ceiling rod anchor and shaped and positioned so that horizontally extending T-pipe sections can extend outward in either direction from a pipe received in any one of the modules of the gang pipe hanger without interference with any other of the multi-pipe hangers in the gang hanger.

BRIEF DESCRIPTION OF THE DRAWINGS

FIG. 10 is a side elevation of an assembly using still another modification of the multi-pipe hanger suspension portions, two such portions being disposed one above the other on the same anchor.

DESCRIPTION OF THE PREFERRED EMBODIMENT

Figure 1:
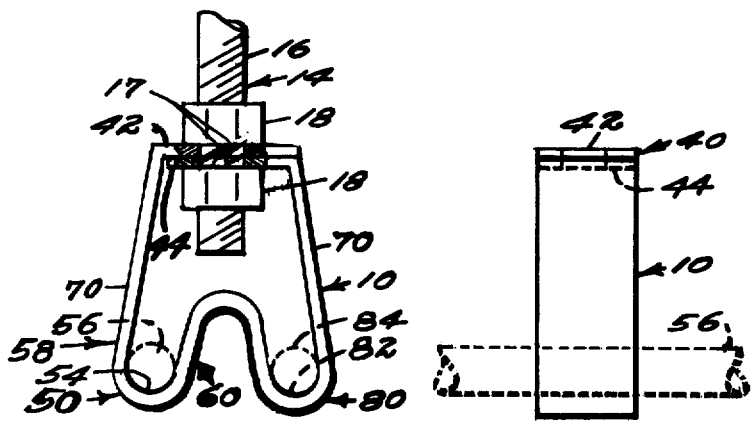
FIG. 1 is a side elevation of a multi-pipe hanger of this invention of the two pipe size with parts broken away for showing the interior.

The multi-pipe hanger of this invention is generally indicated at 10 in FIG. 1, and forms a part of a multi-pipe hanger assembly, generally indicated at 12, which latter comprises the hanger 10 and a rod ceiling anchor and retainer assembly, generally indicated at 14, which latter comprises a rod ceiling anchor 16 in the form of a threaded shaft extended down ceiling portions of a builing, which latter are not shown. The anchor 16 has retainer nuts 18 on it disposed above and below a support assembly 40 of the hanger 10, which latter comprises a pair of attachment sections, specifically an upward attachment section 42 and a lower attachment section 44, which latter are each horizontally elongated and disposed against each other in parallelism, and are formed of sheet metal material preferably, and are compressed between the retainer nuts 18.

It is preferred that the entire hanger 10 be formed of a single piece of material, such as flat sheet metal stock of a relatively thin nature for economy.

And so the support assembly 40 extends generally horizontally.

A first pipe-receiving module, generally indicated at 50, is a part of the hanger 10 and has a concave surface 54 on its upper side for receiving therethrough a pipe 56, shown in dotted lines of FIG. 1, the surface 54 being preferably in the shape of a half portion of a cylinder of a diameter for snugly receiving the pipe 56.

Right and left connecting sections 58 and 60 connect ends of the first pipe-receiving module 50 to and left downwardly depending sections 70, which latter extend downwardly from the left end of the upper attachment section 42 and the right end of the lower attachment section 44, respectively.

The downwardly depending sections 70 preferably extend outwardly at an obtuse angle with respect to the fvertical, the right depending section 70 therefore inclining away from the left downwardly depending section 70 somewhat.

At least one other pipe-receiving module is provided, and in the modification of FIG. 1 the other pipe-receiving module is a second module indicated at 80, and which also has an upwardly facing concave pipe-receiving surface 82 therein, the surface 82 likewise being of a shape of a portion of a cylinder for receiving a cylindrical pipe 84.

The second module 80 forms a portion of the connecting means 60 which connects the right end of the first module 50 to the right downwardly depending section 70.

Figure 2:
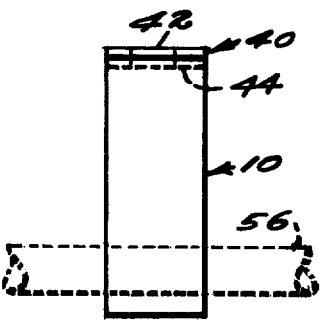
FIG. 2 is a right side elevation of the suspension portion of the pipe hanger of FIG. 1 shown with pipes in it.
Figure 3:
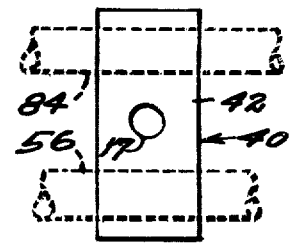
FIG. 3 is a top plan view of the suspension portion of the hanger of FIG. 1 shown with pipes in it.

Referring to FIGS. 1 to 3, in operation it can be seen that after the rod ceiling anchors 16 are attached to a ceiling and the hangers 10 are attached to the respective anchors, then the pipes 56 and 84 can be slid into the hangers along a row of hangers end-wise.

However, it can also be seen that the hangers can be first placed on the pipe if that is desired in a tight place and thereafter the hanger 10 can be attached to the respective anchor 16.

Figure 4:
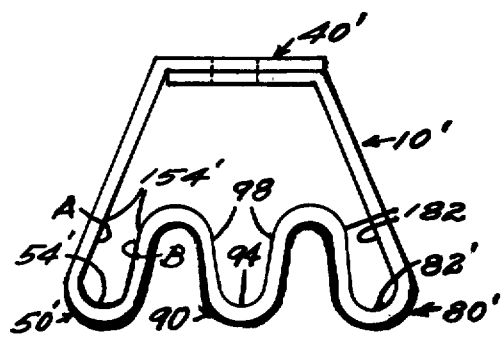
FIG. 4 is a side elevation of a modification of the pipe hanger suspension portion of FIG. 1, but in which there are three pipe-receiving segments on the same level.
Figure 5:
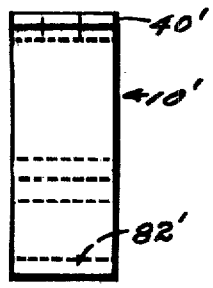
FIG. 5 is a right side elevation of the multi-pipe hanger suspension portion of FIG. 4.

Referring to the modification of FIG. 4, the hanger there shown at 10' is describable in the same ways as the hanger of FIG. 1, with the exception that between the left and right or first and second modules 50' and 80' there is disposed a third module 90, having a concave upper pipe supporting surface 94.

Above the surface 94 there is adequate clearance between the surface 94 and the support assembly generally indicated at 40 for a pipe of a size of snugly fit against the surface 94 to be received against the surface 94 by applying the hanger 10' of FIG. 4 onto a pipe in such a way that the hanger is moved with respect to the pipe for passing toward the bottom of the surface 94 from its upper side and the spacing of points 98 at the upper ends of the opposite sides of the concave surface 94 such as to freely permit this.

However, FIG. 4 also illustrates another feature. As an alternative it is possible for the concave surfaces 54' and 82' of first and second modules 50' and 80' of the modification of FIG. 4 to have uppermost portions 154' on opposite sides of the concave surface 54 and at the uppermost ends thereof which are spaced apart a lesser distance then lower portions of the two sides A and B of the concave surface 54', whereby the points 154' would need to spring apart somewhat if the clip were inserted onto a pipe, rather than having the clip already fixed to a ceiling, and the pipe simply slid into place through an already stationary hanger.

In the modification of FIG. 4 the support assembly 40' can be identical to the support assembly 40 of FIG. 1.

Figure 6:
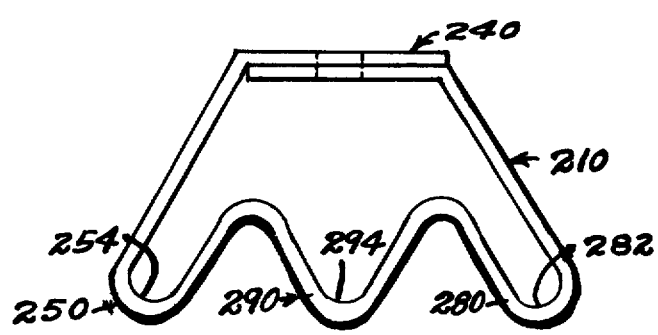
FIG. 6 is a modification of the multi-pipe hanger suspension section of FIG. 1, as seen in frontal elevation with three pipe-receiving segments on the same level, but of somewhat different shape than the suspension portion of FIG. 4.
Figure 7:
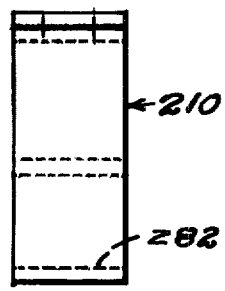
FIG. 7 is a right side elevation of the modified suspension portion of FIG. 6.

In FIG. 6 the modification 210 of the hanger is shown in which the support portion 240 can be identical to the support portion 40 of FIG. 1, although various modules such as the first module 250, a second module 280 and a third module 290 are arranged with their concave surfaces 254, 282 and 294.

Figure 9:
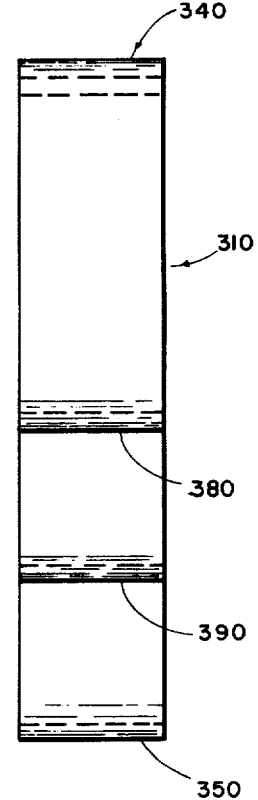
FIG. 9 is a side elevation of the suspension portion of the modification of FIG. 8.

Referring to FIG. 9 still another modified clip is there shown at 310 having a similar support assembly 240 to the support assembly 40 of FIG. 1, and having first, second and third pipe receiving modules 350, 380 and 390, having lowermost portions of their upwardly facing concave surfaces 354, 382 and 392, respectively, disposed at different levels so as to be equi-distantly stair-stepped vertically upward with respect to each other from left to right.

In FIG. 10 a gang pipe hanger is there generally shown at 500 and comprises upper and lower multi-pipe hangers 510 and 610, each of which has a support assembly 540 and 640, respectively, similar to the support assembly of FIG. 1, and each of which has first and second pipe receiving modules 550 and 580 for the upper hanger 510 and 650 and 680 for the lower hanger 610.

The module 550 has a lower portion of its concave pipe supporting surface 554 disposed above the lower portion of the concave pipe supporting surface 582 of the second module 580.

From the support assembly 540 there are left and right downwardly depending sections 570 which connect to the left and right sides of the first and second modules 550 and 580, respectively. The right side of the module 550 can be considered to be connected to the right downwardly depending section 570 by the right module 580 and also by a bridge section 590 which interconnects the left side of the left module 550 with the right side of the right module 580.

The bridge portion 590 has a central part 592 which is upwardly disposed from the lowermost part of the left concave surface 554 and is then provided with a hole 598 extending vertically therethrough and disposed in alignment with openings 594 and 596 in upper and lower attachment sections 542 and 544 of the support assembly 540.

The openings 594 and 596 are disposed in alignment and together form an opening assembly, generally indicated at 597, and extending vertically through the support assembly 540 for receiving a rod ceiling anchor 516 therethrough, which latter is threaded and extends vertically.

In FIG. 10 the lower hanger 610 is identical to the upper hanger and is mounted on the rod ceiling anchor 516 in such a manner that the upper or left pipe receiving module 650 of the lower hanger 610 has its lowermost part of its upper concave surface 654 disposed a substantial distance below the lowermost part of the concave surface 582 of the right module 580 of the upper hanger 510, the spacing being sufficient to permit a pipe extending at a right angle away from a pipe disposed in the left pipe receiving module 650 of the lower hanger 610 to extend horizontally beneath the pipe receiving module 580 at the right of the hanger 510 without touching the hanger 510 so that there is clearance. Such similar spacing is true of any one of the concave surfaces 554, 582, 654 and 682 of the gang pipe hanger of FIG. 10 as regards any other one of the concave surfaces just mentioned, which latter is the next concave surface above or below any given concave pipe receiving surface in question.

The hole 594 is matched by a hole 694 at the identical place in the hanger 610, and with this general principle it will be seen that any number of hangers can be disposed one under the other on a single rod ceiling anchor 516 according to the principles of the modification and gang hanger 500 of FIG. 10.

Nuts 518 are disposed above and below the support assembly 540, and above and below the support assembly 640, and press against the respective upper and lower sides of the respective support assemblies for holding the hangers 510 and 610 firmly in place.

The openings 594 and 596 and the hole 598 of the hanger 510 are each of a size for freely receiving the rod ceiling anchor 516 slidably therethrough.

Even twelve or more pipes can be assembled on the same rod ceiling anchor 516 with the principles of the gang pipe hanger 500 in FIG. 10 provided enough hangers are used.

It can be seen that the hanger 510 of FIG. 10 has its shaft 516 disposed substantially in the central part of the hanger between the most horizontally spaced portions of the hanger 510.

In FIG. 10 it can be seen that the left pipe module of the upper hanger has a large space above and to one side of it.

The first and second downwardly depending portions 570 and the left module 550 of the top hanger of FIG. 10 are so disposed and shaped that an open space 571 exists, such open space 571 being disposed extending upwardly and inwardly from the left concave upwardly facing surface 554 of the left module 550 toward a vertical line 572 extending down the center of the hanger 516 and through the centers of the openings 594 and 596 and the center of the hole 598, for example. Such open space 571 is larger in places closer to the line 572 than at the concave surface 554 of the left module 550.

Figure 8:
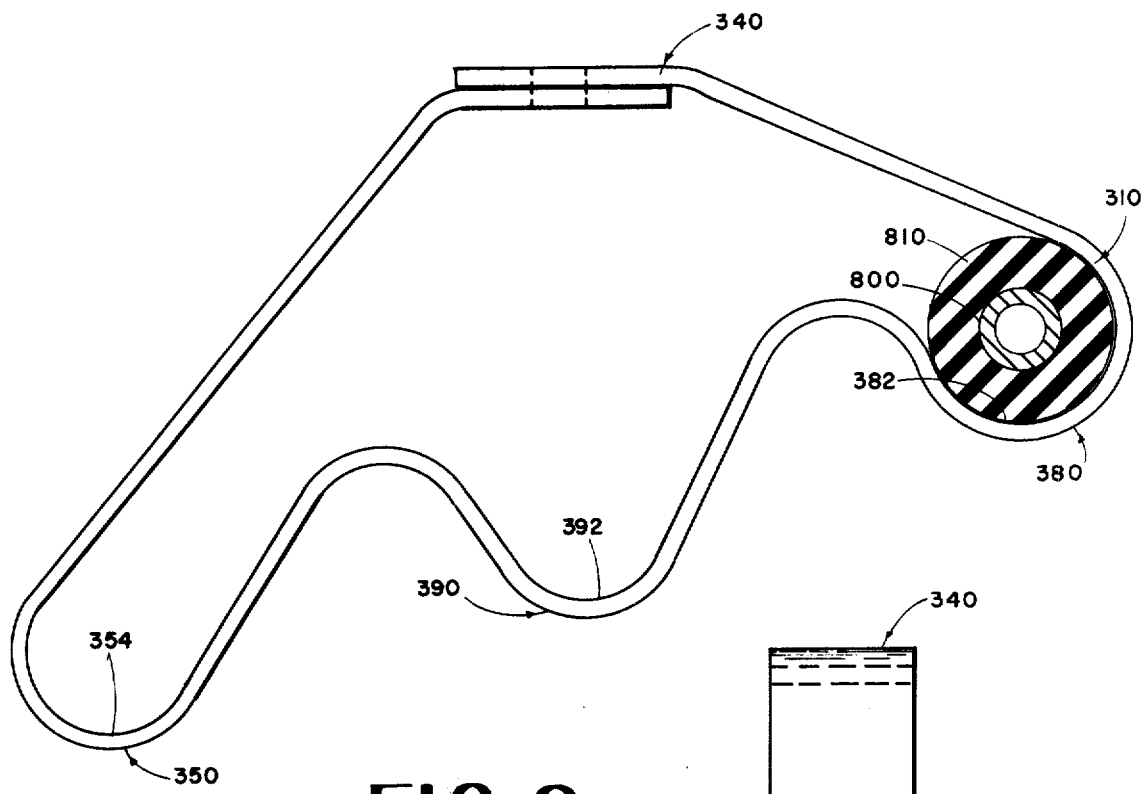
FIG. 8 is a modified stair-step multi-pipe hanger suspension portion.

Referring to FIG. 8, it can be seen that a hanger can also be used for plumbers at times when a plumber is using an insulated pipe since such a pipe is shown at 800 surrounded by its insulation 810 and the respective hanger 310 is then simply made of a size to receive the insulation 810.

I claim:

1. A multi-pipe multi-level hanger assembly comprising a multi-pipe hanger comprising a support assembly extending generally horizontally, first and second downwardly depending sections attached to respective ends of said support assembly, a first pipe-receiving module which is concave on its upper side, connecting means connecting ends of said first pipe-receiving module to lower ends of said downwardly depending sections respectively, at least one other pipe-receiving module also having an upwardly facing concave pipe-receiving surface and forming part of said connecting means, said other module having its concave upwardly facing surface disposed horizonally and vertically spaced from the concave upper surface of said first module, said support assembly comprising a pair of attachment sections disposed one above another and having aligned vertical openings therethrough for receiving a rod ceiling anchor therethrough, said attachment sections defining first and second attachment sections connected respectively to said first and second downwardly depending portions, said attachment sections and said modules, said connecting means and said downwardly depending sections all being substantially formed from a single piece of material, said connecting means having a hole extending vertically therethrough disposed between said pipe-receiving modules and directly beneath and on a same straight vertical line with said support assembly openings.

2. The multi-pipe multi-level hanger assembly of claim 1 having an attachment shaft extending vertically through said openings and through said hole, and hanger engaging means connected to said shaft and engaging said hanger and upholding said hanger on said shaft.

3. The multi-pipe multi-level hanger assembly of claim 2 having said shaft being threaded, said hanger engaging means comprising a first nut disposed under said support assembly, and a second nut disposed above said support assembly, said support assembly being compressed between said nuts.

4. The multi-pipe multi-level hanger assembly of claim 3 having said first and second downwardly depending portions and at least one of said modules being so disposed and shaped that an open space exists, said open space being disposed upwardly and inwardly toward said vertical line from said concave upwardly facing surface of said one module, said open space being larger at places closer to said line than at the concave surface thereof.

5. The multi-pipe multi-level hanger assembly of claim 2 having said first and second downwardly depending portions and at least one of said modules being so disposed and shaped that an open space exists, said open space being disposed upwardly and inwardly toward said vertical line from said concave upwardly facing surface of said one module, said open space being larger at places closer to said line than at the concave surface thereof.

6. The multi-pipe multi-level hanger assembly of claim 1 and having said first and second downwardly depending portions and at least one of said modules being so disposed and shaped that an open space exists, said open space being disposed upwardly and inwardly toward said vertical line from said concave upwardly facing surface of said one module, said open space being larger at places closer to said line than at the concave surface thereof.

* * * * *